US011068252B2

(12) United States Patent
Rajagopalan et al.

(10) Patent No.: US 11,068,252 B2
(45) Date of Patent: Jul. 20, 2021

(54) SYSTEM AND METHOD FOR DYNAMICALLY DETERMINING APPLICABLE UPDATES

(71) Applicant: DELL PRODUCTS, LP, Round Rock, TX (US)

(72) Inventors: Vivekanandh Narayanasamy Rajagopalan, Bangalore (IN); Srikanth Kondapi, Austin, TX (US); Ambadas Devrao Jadhav, Ahmednagar District (IN); Salna Viswanathan Thekkekalathil, Bangalore (IN); Ta-Jung (Joseph) Yeh, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/571,606

(22) Filed: Sep. 16, 2019

(65) Prior Publication Data

US 2021/0081188 A1    Mar. 18, 2021

(51) Int. Cl.
  *G06F 8/65*    (2018.01)
(52) U.S. Cl.
  CPC .................................... *G06F 8/65* (2013.01)
(58) Field of Classification Search
  CPC ....................................................... G06F 8/65
  See application file for complete search history.

(56) References Cited

U.S. PATENT DOCUMENTS

| | | | | |
|---|---|---|---|---|
| 8,397,230 | B2* | 3/2013 | Ewington | G06F 8/658 717/168 |
| 8,438,315 | B1* | 5/2013 | Tao | G06F 13/102 710/8 |
| 10,789,058 | B2* | 9/2020 | Gandhi | G06F 9/3017 |
| 2005/0172280 | A1* | 8/2005 | Ziegler | G06F 21/56 717/168 |
| 2005/0198493 | A1* | 9/2005 | Bartas | H04L 67/06 713/154 |
| 2006/0026590 | A1* | 2/2006 | Berenberg | G06F 8/656 717/175 |

(Continued)

OTHER PUBLICATIONS

Kucheravy et al., "System and Method to Deploy or Update Operating System Service Capabilities," Pending U.S. Appl. No. 15/972,893, filed May 7, 2018, 20 pgs.

(Continued)

*Primary Examiner* — Phillip H Nguyen
(74) *Attorney, Agent, or Firm* — Larson Newman, LLP

(57) ABSTRACT

A system includes a systems manager configured to retrieve an update package that includes an update installer for updating the information handling system, and to install the update package with the update installer. The update installer retrieves an operating system build number from the information handling system, and parses a metadata file included in the update package to determine a device group based on the operating system build number, wherein the device group includes the applicable updates for the information handling system. The update installer determines a mode of installation based on the operating system build number of the device group, determines a sequence of installation of the applicable updates, and installs the applicable updates according to the sequence of installation and the mode of installation.

18 Claims, 14 Drawing Sheets

(56) References Cited

U.S. PATENT DOCUMENTS

| | | | |
|---|---|---|---|
| 2007/0169081 A1* | 7/2007 | Zhao | G06F 8/65 |
| | | | 717/168 |
| 2010/0211943 A1* | 8/2010 | Chu | G06F 8/61 |
| | | | 717/174 |
| 2018/0321933 A1 | 11/2018 | Kondapi et al. | |
| 2019/0250928 A1 | 8/2019 | Vidyadhara et al. | |
| 2019/0354357 A1* | 11/2019 | Gandhi | H04L 67/34 |
| 2019/0369978 A1* | 12/2019 | Gandhi | G06F 9/44521 |

OTHER PUBLICATIONS

Sanaullah et al., "System and Method to Update Operating System Services," Pending U.S. Appl. No. 15/972,901, filed May 7, 2018, 24 pgs.

* cited by examiner

```
800-A

222
    <supportedoperatingsystems>
      <osidentifier name="Windows10" architecture="x64" />
    </supportedoperatingsystems>                                    ~ 802
        <subsystem>Network</subsystem>
        <AppliesTo>
            <DeviceInformation>Name for device 1</DeviceInformation>
            <DeviceInformation>Name for device 1</DeviceInformation>
        </AppliesTo>

<content dch="true" base="16299">
      <DeviceGroup Build=16299>
            <Device componentID="123456">
                <PCIInfo vendorID="5678" deviceID="90AB" subDeviceID="0123" subVendorID="4578" />
                <Image type="DRVR" version="1.0.1.1" inftype="base">      ~ 805
                  <file>Folder1\Drivers\a.inf</file>
                </Image>
            </Device>
            <Device componentID="123456">
                <Image type="DRVR" version="1.5.0.0" delay="20" inftype="extension" Id="{C1438A39-B8FD-4604-87A1-AD20A3AED93D}">
                  <file>Folder1\Drivers\a_ext.inf</file>
                </Image>
            </Device>
            <Device componentID="123456">
                <Generic>SWC\VID_0012&PID_A000&SID_000F</Generic>
                <Image type="DRVR" version="1.6.0.0" inftype="component">  ~ 806
                  <file>Folder1\Drivers\a_comp.inf</file>
                </Image>
            </Device>
            <Device componentID="123456">
                <Image type="APP" version="1.5.0.0" id="MUP.SampleControlCenter__re01ki8y5hjok">
                  <file appxtype="appx">Folder1\Appx\sample.appx</file>
                  <file appxtype="license">Folder1\Appx\sample_license1.xml</file>
                  <file appxtype="dependency">Folder1\Appx\sample_dependency.appx</file>
                </Image>
            </Device>
      </DeviceGroup>
    </content>                                                          ~ 804
    <content>                                                           ~ 803
        <Device componentID="123456">
            <PCIInfo vendorID="5678" deviceID="90AB" subDeviceID="0123" subVendorID="4578" />
            <Image type="DRVR" version="1.0.1.1">
                <file>Legacy\Drivers\a_nondch.inf</file>
            </Image>
        </Device>                                                       ~ 807
    </content>
```

```xml
<Manifest baseLocation="downloads.dell.com" dateTime="2019-02-22T13:11:20+05:30" identifier="faea80e9-
3908-4cfe-8d37-0f0ac978c274" releaseID="D0T8G" version="2019.02.22" xmlns="openmanage/cm/dm">   ⟵ 809
<SoftwareComponent schemaVersion="3.0" releaseID="CFXPV" releaseDate="December 25, 2015"
vendorVersion="1.1.0.0" dellVersion="A01" packageType="LWXP" path="FOLDER03487950M/1/
Network_Driver_CFXPV_WN32_2.43.2015.1225_A01.EXE" packageID="CFXPV" dateTime="2015-10-
30T08:49:35+05:30" size="19970976" identifier="4016a80a-4a3e-45a0-9833-6ca780611d19"
baseBuildNumber="16299" >
                                                               ⟵ 810
<DeviceGroup>
<Device>guid1</Device>  ⟵ 811
<Device>guid2</Device>  ⟵ 812  ⟵ 815
<OperatingSystem osCode="W10P4" osVendor="Microsoft" osArch="x64" majorVersion="10" minorVersion="0"
spMajorVersion="0" spMinorVersion="0" buildnumber="15063">
                                                  ⟵ 820
<Display lang="en"><![CDATA[Windows 10 64-Bit]]></Display>  ⟵ 825    ⟵ 826
</OperatingSystem>
</DeviceGroup>
                                              ⟵ 830
<DeviceGroup>
<Device>guid3</Device>
<Device>guid6</Device>
<OperatingSystem osCode="W10P4" osVendor="Microsoft" osArch="x64" majorVersion="10" minorVersion="0"
spMajorVersion="0" spMinorVersion="0" buildnumber="16299">
<Display lang="en"><![CDATA[Windows 10 64-Bit]]></Display>
</OperatingSystem>
</DeviceGroup>               ⟵ 832
<SupportedDCHDevices>         ⟵ 840     ⟵ 845     ⟵ 850    ⟵ 835
<Device guid="guid1" componentID="100352" version="6.0.1.8229" type="base" >
<PCIInfo vendorID="10EC" deviceID="0225" subVendorID="1028" subDeviceID="080C"/>
<PCIInfo vendorID="10EC" deviceID="0668" subVendorID="1028" subDeviceID="079C"/>
<PCIInfo vendorID="10EC" deviceID="0668" subVendorID="1028" subDeviceID="079D"/>
<PCIInfo vendorID="10EC" deviceID="0255" subVendorID="1028" subDeviceID="0863"/>
<PCIInfo vendorID="10EC" deviceID="0255" subVendorID="1028" subDeviceID="0864"/>
<Display><![CDATA[High Definition Audio Driver]]></Display>      ⟵ 875   ⟵ 855
</Device>     ⟵ 860    ⟵ 865              ⟵ 870       ⟵ 880
<Device guid="guid2" componentID="100352" version="1.6.1891.0" type="component" >
  <Generic>SWC\VID_1A56&PID_1000&SID_0001</Generic>
<Display><![CDATA[High Definition Audio Driver]]></Display>
</Device>
</SupportedDCHDevices>
```

```
<?xml version="1.0" encoding="UTF-16"?>
<SVMInventory lang="e" schemaVersion="1.0" timeStamp="2019-04-08T13:50:05"
invcolVersion="8.1.0.3">
        <OperatingSystem osVendor="Microsoft" osCode="WIN" osArch="x64" majorVersion="10"
minorVersion="0" spMajorVersion="0" spMinorVersion="0" buildNumber="15063"/>              ~ 897
        <System systemID="07A7" TPMmeasurementsOn="false"/><Device componentID="159"
display="BIOS" impactsTPMmeasurements="true"><Application componentType="BIOS"
version="1.8.2" display="BIOS"/></Device>
        <Device vendorID="8086" deviceID="9D21" subDeviceID="07A7" subVendorID="1028"
bus="0" device="31" function="2" display="Mobile 6th/7th Generation Intel(R) Processor Family I/O
PMC - 9D21"><Application componentType="DRVR" version="10.1.1.38" packageVersion="0"
display="Mobile 6th/7th Generation Intel(R) Processor Family I/O PMC - 9D21 Driver"/></Device>
        <Device vendorID="8086" deviceID="9D60" subDeviceID="07A7" subVendorID="1028"
bus="0" device="21" function="0" display="Intel(R) Serial IO I2C Host Controller - 9D60"><Application
componentType="DRVR" version="30.100.1633.3" packageVersion="0" display="Intel(R) Serial IO
I2C Host Controller - 9D60 Driver"/></Device>
        <Device componentID="107174" display="Dell Command | Update for Windows
10"><Application componentType="APAC" version="3.0.1" packageVersion="3.0.1" display="Dell
Command | Update for Windows 10"/></Device>
        <Device componentID="107671" display="Citrix Receiver Inside"><Application
componentType="APAC" version="4.9.0.65534" packageVersion="4.9.0.65534" display="Citrix    ~ 898
Receiver Inside"/></Device>
        <Device componentID="107680" display="Wyse Device Agent"><Application
componentType="APAC" version="14.0.0.239" packageVersion="14.0.0.239" display="Wyse Device
Agent"/></Device>
        <Device display="BroadcomLimited.DellControlVault-ContactlessSmartc"
packageFamilyName="BroadcomLimited.DellControlVault-
ContactlessSmartc_0jcfk12cfzgr2"><Application componentType="APAC" version="10.0.11.0"
display="BroadcomLimited.DellControlVault-ContactlessSmartc " packageVersion="10.0.11.0 "/></
Device>
</SVMInventory>
```

*FIG. 8C*

SYSTEM AND METHOD FOR DYNAMICALLY DETERMINING APPLICABLE UPDATES

FIELD OF THE DISCLOSURE

The present disclosure generally relates to information handling systems, and more particularly relates to dynamically determining applicable updates.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A systems manager may retrieve an update package that includes an update installer for updating the information handling system, and install the update package with the update installer. The update installer retrieves an operating system build number from the information handling system, and parses a metadata file included in the update package to determine a device group based on the operating system build number, wherein the device group includes the applicable updates for the information handling system. The update installer determines a mode of installation based on the operating system build number of the device group, determines a sequence of installation of the applicable updates, and installs the applicable updates according to the sequence of installation and the mode of installation.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 8A is a diagram of an exemplary update metadata file, according to at least one embodiment of the present disclosure;

FIG. 8B is a diagram of an exemplary update catalog, according to at least one embodiment of the present disclosure;

FIG. 8C is an exemplary inventory report, according to at least one embodiment of the present disclosure;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
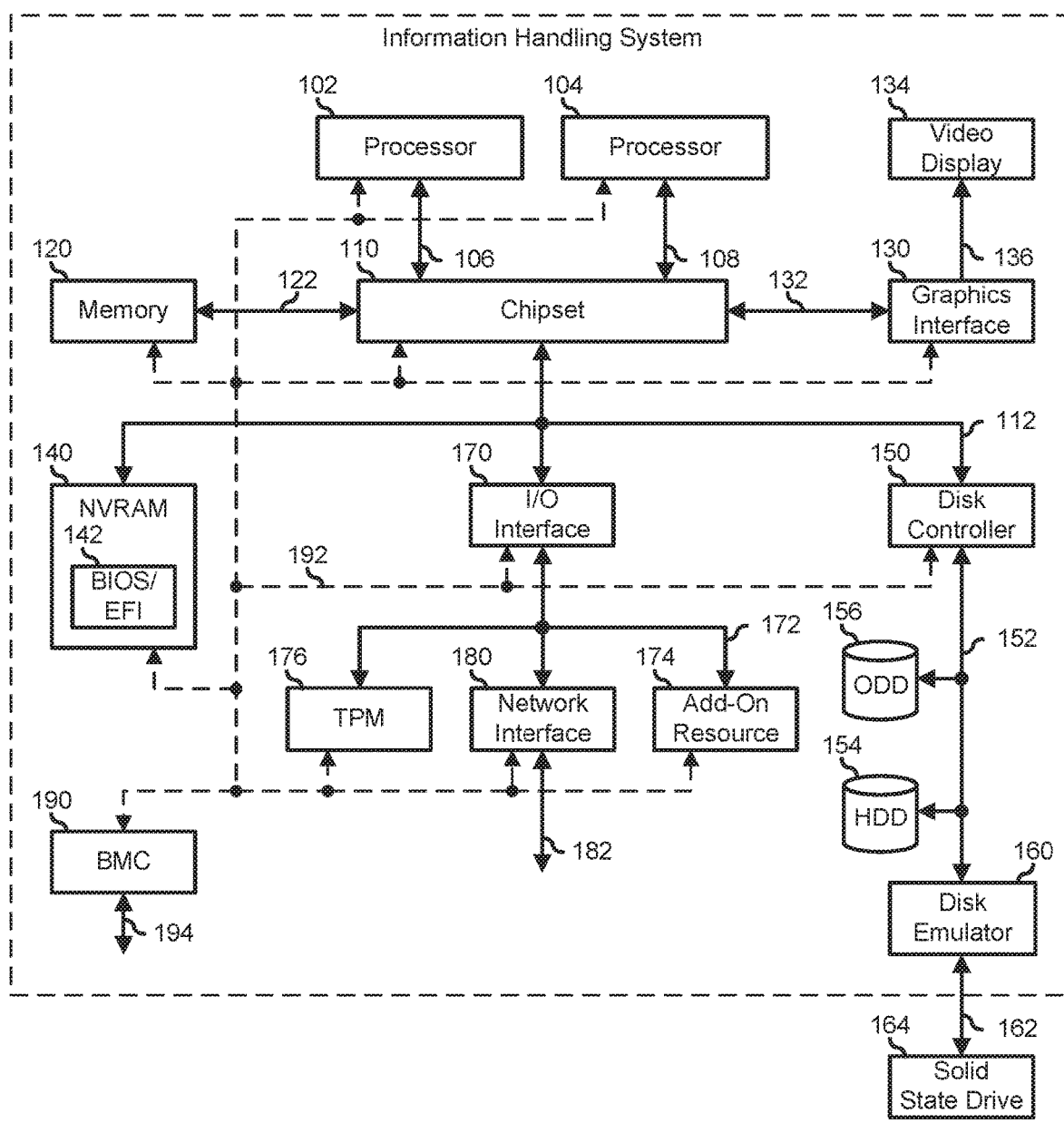
FIG. 1 is a block diagram of a general information handling system, according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In an embodiment, processors 102 and 104 are connected via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In an embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In an embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices. In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code. BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated into another element of the information handling system such as chipset 110, or another suitable element, as needed or desired. As such, BMC 190 can be part of an integrated circuit or a chipset within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Traditionally, information handling systems such as information handling system 100 can be shipped with software bundled by an original equipment manufacturer (OEM). An OEM support site can provide updates to the bundled software. The updates may be in the form of update packages. An end-user would traditionally browse the OEM support site based on specific criteria such as a model name of a component, a model number of the component, an operating system, etc. to download the latest updates. In some embodiments, an automatic update feature for the OEM software can be enabled, either automatically updating the software or by notifying the user when an update is available. Because a device may be associated with multiple drivers and applications, the user needs to go to the OEM support site several times to download and deploy each of those drivers and applications.

Thus, there is a need to package these drivers and applications in such a way that an intelligent algorithm can dynamically determine which update package is applicable for the components in the information handling system and determine and deploy the applicable payload. The novelty of the current disclosure includes removing the need for having a vendor installer to install individual drivers. As used herein, a universal driver is a declarative componentized, hardware support application (HSA) and universal API compliance (DCHU) compliant driver. The HSA may be installed using a Windows API. The current disclosure adds the ability to install the HSA outside of the Windows® store. This supports the use case wherein an enterprise blocks access to the Windows® store for security. The current disclosure also adds the concept of device groups which allows installation of related drivers according to a sequence, based on the operating system build number supported, improving odds against installation failures. Currently, drivers are installed individually by an information (INF) file and not correlated with other drivers or installers. The current disclosure also includes an algorithm to determine the update package applicable for a particular component or information handling system based on the operating system build number.

Figure 2:
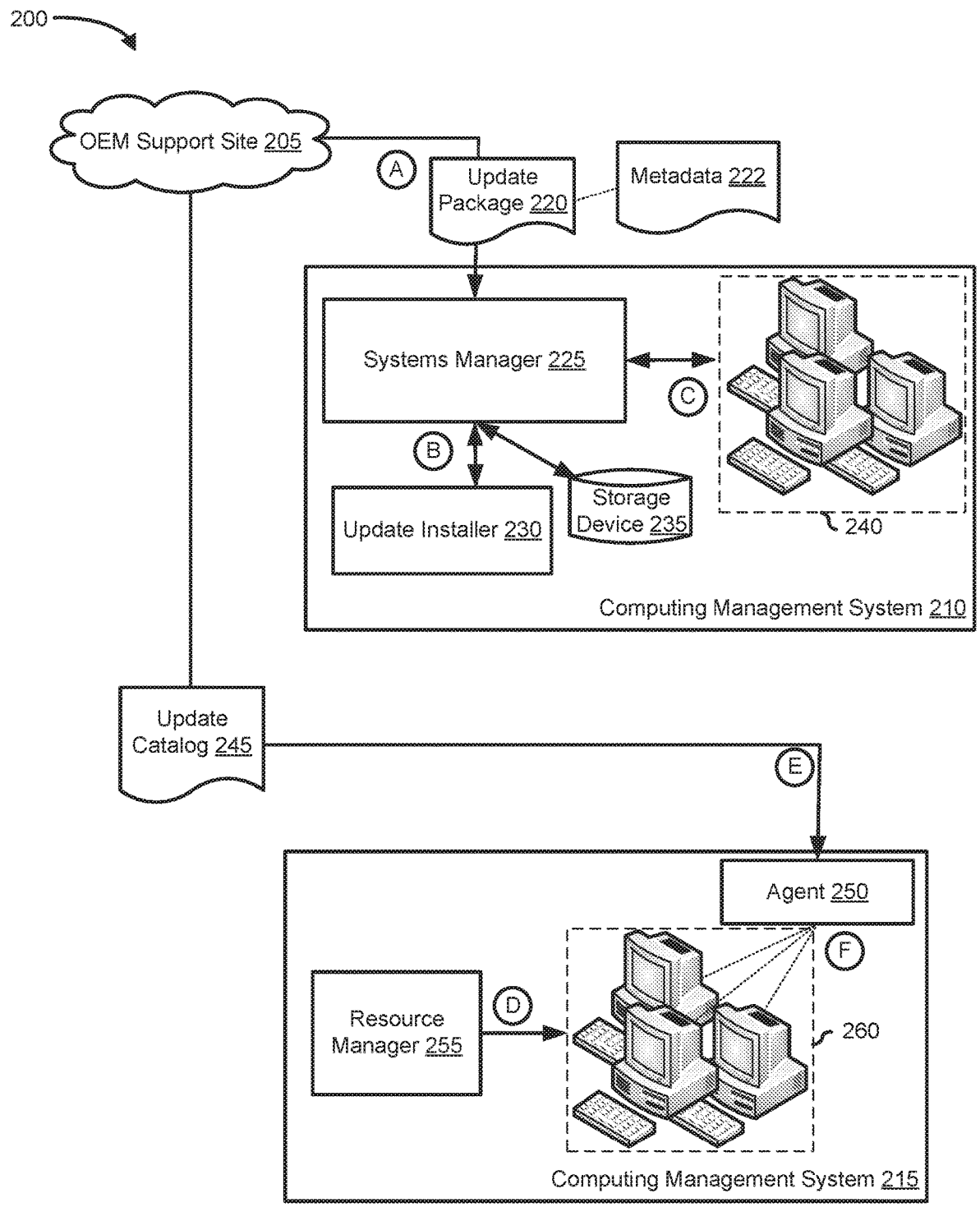
FIG. 2 is a block diagram of a system for dynamically determining applicable updates, according to at least one embodiment of the present disclosure.

FIG. 2 is a block diagram 200 illustrating software deployment in computing management systems 210 and 215 via an OEM support site 205. Computing management system 210 includes a systems manager 225, an update installer, a storage device 235, and managed resources 240. Computing management system 215 includes a resource manager 255, an agent 250, and managed resources 260. Managed resources 240 and managed resources 260 are each a set of information handling systems or devices such as information handling system 100.

Computing management system 210 is configured to manage devices and deploy applications and/or updates via systems manager 225. As used herein, updates refer to software and firmware updates. Systems manager 225 provides a unified management console with the automated set of administrative tools for managing managed resources 240. Computing management system 215 is configured to manage devices and deploy applications and updates via an update agent such as agent 250 deployed to each one of managed resources 260. Resource manager 255 is configured to centrally manage, secure, and/or control managed resources 260 including applications therein. Resource manager 255 may be hosted in the cloud and may be configured to deploy agent 250.

Agent 250 may be installed in an information handling system during its manufacture. In another embodiment, resource manager 255 of FIG. 2 may install agent 250 during the setup of each of managed resources 260. Agent 250 may be configured to perform various tasks such as to perform an inventory of components of each of the managed resources 260. Agent 250 may also be configured to operate in the background of each of the managed resources 260 to monitor those components such as to determine whether one or more of the components needs an update. Finally, agent 250 may be configured to perform the task of updating the components needing an update. The task of updating includes downloading and parsing a published update catalog also referred herein as a catalog such as an update catalog 245. Based on update catalog 245, agent 250 downloads one or more files that may have been combined into a package format such as a Microsoft® cabinet (CAB) file or a .zip file format. The one or more files may be in a compressed format, may be digitally signed, and may be encrypted. Agent 250 may cause the update package to be decompressed, may cause the signature to be verified, and may cause the transfer of the one or more files to be decrypted, as necessary.

An update installer 230 may be configured to provide a graphical user interface (GUI), an API, and command-line interface support to determine and download update packages for a particular information handling system such as an update package 220. Update package 220 may include a payload which may be compressed, self-extracting files such as a driver, a service pack, an update, a hotfix, an HSA, and other support files. Update package 220 may also include a specified set of limiting preconditions which may be stored in a device INF file, a file containing scripts used to control hardware operations (often called the ".INF" file after the file extension used for device information files written for use with the Windows operating system).

Update installer 230 may be configured to determine the applicable payload included in the update package 220 to install in each of managed resources 240. In particular, update installer 230 may use an applicability algorithm to determine the applicable payload. Update installer 230 may install the one or more drivers and/or applications included in the applicable payload according to a sequence. For example, a base driver may be installed first followed by an extension driver, then a component driver, and finally the HSA. Update installer 230 may also include framework components required to run on the information handling system operating system and architecture. Examples of update installer 230 include Dell update application and Microsoft .NET Framework (web installer) package.

Update package 220 may include an update metadata file such as a metadata file 222. Metadata file 222 may be a .xml, a JavaScript object notation (JSON) file or similar that includes information regarding update package 220 and its payload such as version and release information. Metadata file 222 is used by update installer 230 when running the applicability algorithm. A manageable update package (MUP) is an example of metadata file 222.

Storage device 235 may be any suitable storage device such as rotating disk drives, flash-based storage, solid-state storage device (such as a flash-based storage device), and the like. Other types of commercially available data storage systems, as well as processors and hardware controlling access to these devices, may also be included in an embodiment. Storage device 235 may be configured to store update package 220 and update catalog 245 in a database or in a file system for example.

OEM support site 205 may include a server and a persistent memory where catalogs and updates are persisted such as update catalog 245 and update package 220. In a particular embodiment, the server can be a file server, a database server, or the like. The persistent memory can include one or more disk drives or other suitable persistent memory. If the server is a database server, then the updates and/or catalogs within the repository can be organized as a database. If the server is a file server, the file server can locate a file corresponding to the update and send it to systems manager 225 and agent 250. OEM support site 205 may be located locally on-premise or remotely from computing management systems 210 and 215.

Agent 250 may be configured to detect an application and/or a firmware in a managed resource such as one of managed resources 270. In addition, agent 250 may be configured with information associated with OEM support site 205 such as its location. Agent 250 may also be configured determine whether a catalog and/or an update has been published in OEM support site 205 and to determine whether such catalog and/or update is applicable or required by managed resources 260. Agent 250 may scan OEM support site 205 periodically, such as hourly, daily, weekly, etc. to determine if a catalog has been published. In another embodiment, OEM support site 205 may be configured to notify agent 250 and/or resource manager 255 if update catalog 245 or update package 220 has been published. An example of agent 250 is a Dell OpenManage® inventory agent. Resource manager 255 may be configured to provide a remote administrator with an ability to cause tasks to be performed on managed resources 260.

Catalogs such as an update catalog 245 include metadata such as a download uniform resource locator (URL) or location of the updates, name of the company or organization that created the catalog, date/time the catalog was last imported or modified, etc. Update catalog 245 also includes information that may be used to determine which of the updates are required for the resources being managed by computing management system 210. For example, update catalog 245 may include information regarding the driver version, supported component identifiers, supported operating system information such as supported operating system build number as shown in an supportedoperatingsystems node 802 of FIG. 8A, etc. For example, update catalog 245 may include information regarding whether the drivers in the payload are DCHU compliant. Update catalog 245 may be used by computing management system 215 to provide automated BIOS, firmware, driver and application updates to managed resources 260. Examples of a catalog include Dell® Business Client Updates Catalog and Microsoft Update Catalog. Update catalog 245 may be used by computing management system 215 to provide automated BIOS, firmware, driver and application updates to managed resources 260. Based on the metadata information in the update catalog and the information in an inventory of components in the information handling system, agent 250 may apply an algorithm to determine the applicable updates. The algorithm may be referred to as an applicability algorithm for update tools.

FIG. 2 is annotated with a series of letters A-F. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations. Stages A to C depicts a first embodiment which uses update installer 230 to determine and install the applicable updates for managed resources 240. Stages D to F depicts a second embodiment which uses agent 250 to determine and install the applicable updates for managed resources 260.

At stage A, systems manager 225 downloads or retrieves and installs update package 220. At stage B, systems manager 225 installs an update installer 230 which may be included with update package 220. In another embodiment, update installer 230 may be downloaded and installed independently from update package 220. After downloading update package 220, the systems manager may store update package 220 in storage device 235. The database may be owned and managed by systems manager 225. The database may be common to the other components in computing management system 210 such as update installer 230.

Figure 9:
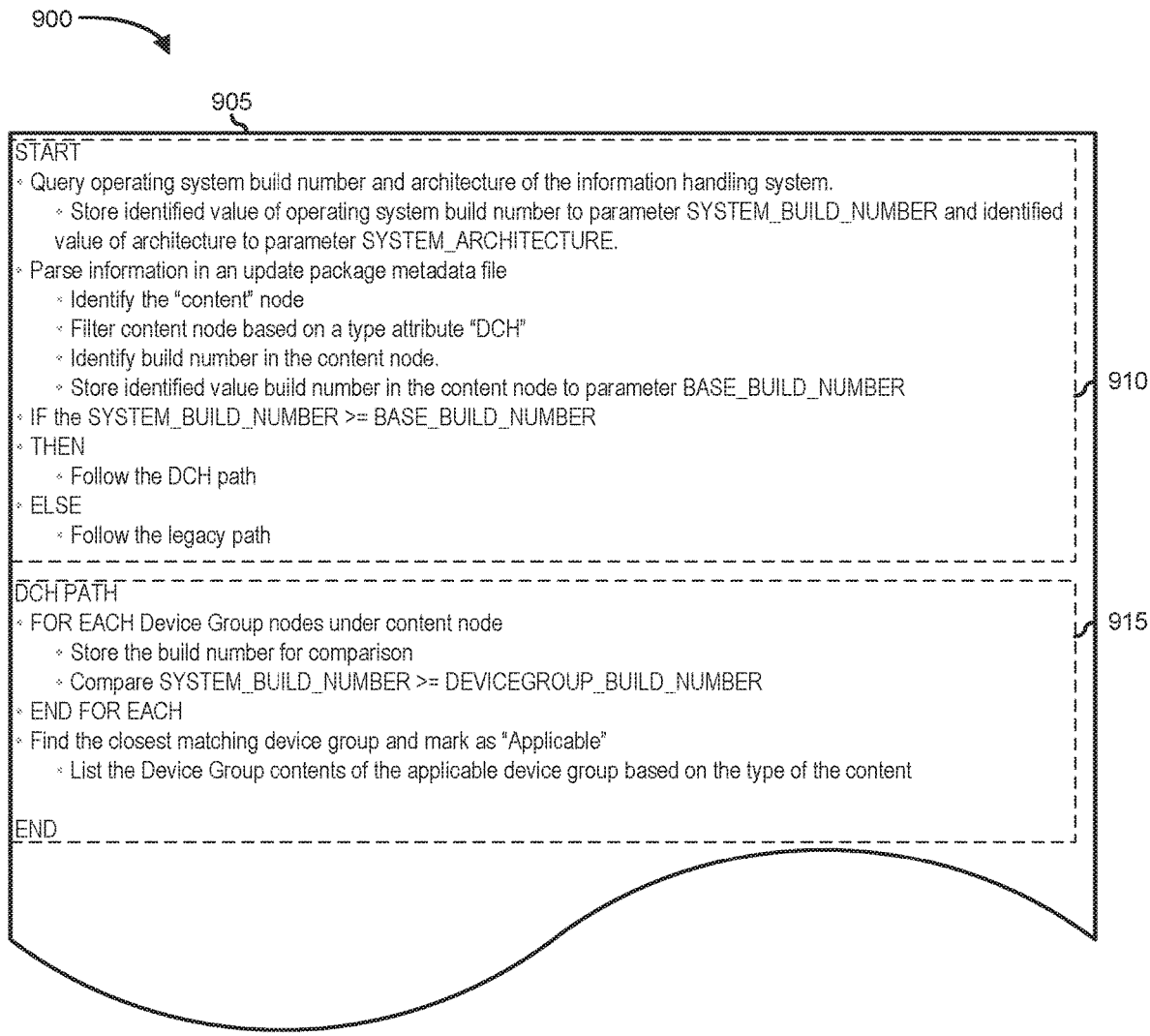
FIG. 9 is a diagram of an exemplary applicability algorithm for the update installer, according to at least one embodiment of the present disclosure.

At stage C, update installer 230 applies the applicability algorithm for update installers as detailed herein. Update installer 230 determines the operating system build number and architecture of each one of managed resources 240. After determining the operating system build number and architecture, update installer 230 parses metadata file 222 and determines the operating system base build number associated with update package 220. The operating system base build number is the supported operating system build number of the drivers in the device group. If the operating system build number is greater than the operating system base build number, then update installer 230 follows one of two modes of installation of the applicable updates. The first mode is referred herein as "DCH path" which is an installation process for DCHU compliant drivers as depicted in FIG. 9. The second mode is referred herein as the legacy installation process (not shown) which is an installation process for non-DCHU compliant drivers. The legacy installation process may use vendor-specific installers to install the drivers.

The applicable updates as used herein refer to updates for one or more components of the information handling system. The applicable updates may be determined based on the information in the update metadata file such as supported base operating system build number of the device group, on the installed components in the information handling system, and operating system build number and architecture of the information handling system. The applicable updates may also be based on drivers and HSAs installed in the information handling system.

Figure 10:
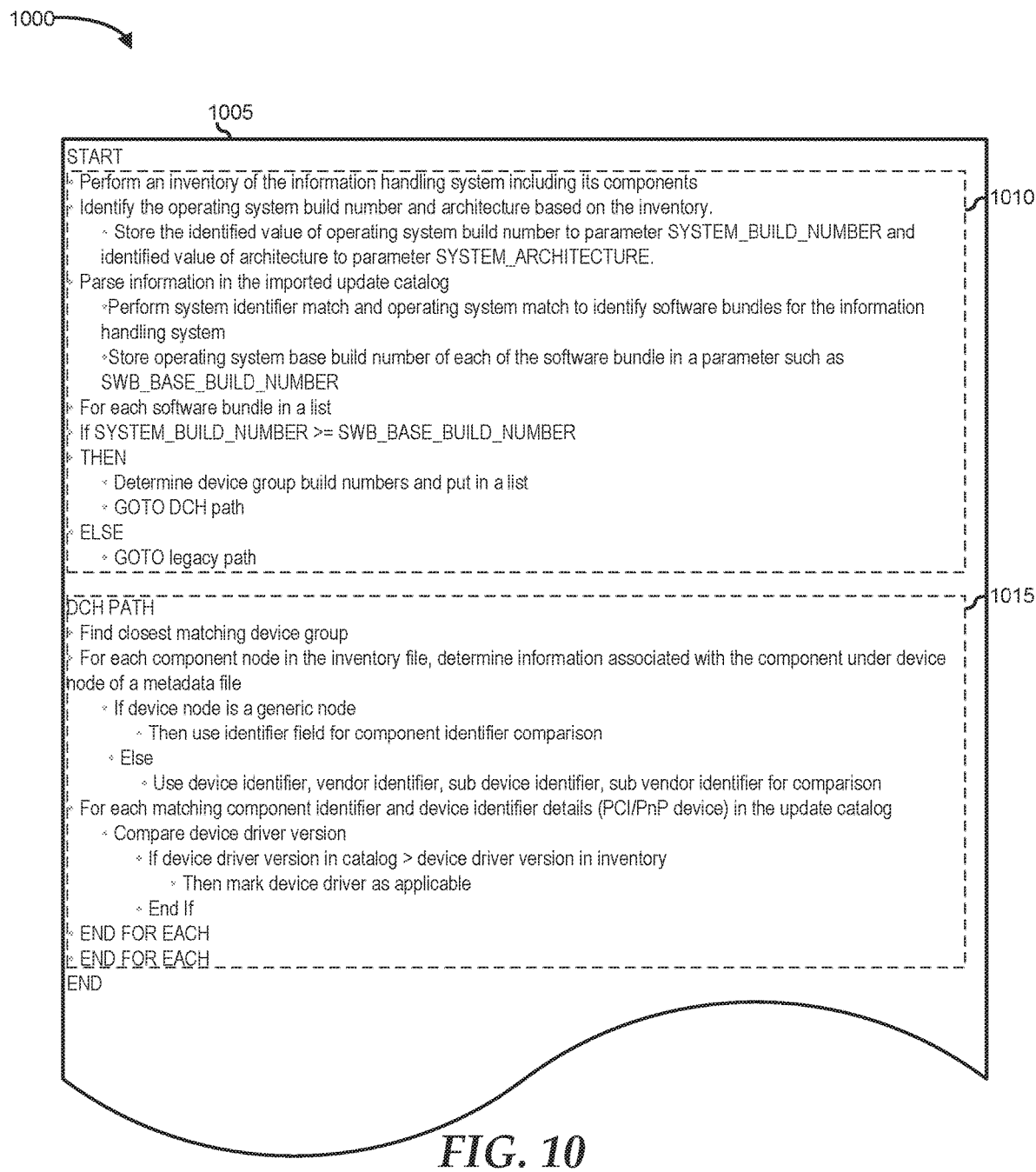
FIG. 10 is a diagram of an exemplary applicability algorithm for the update agent, according to at least one embodiment of the present disclosure.

Prior to stage D, resource manager 255 installs agent 250 in each one of managed resources 260. At stage D, agent 250 may receive a notification when update catalog 245 has been published. In another embodiment, agent 250 may poll or scan OEM support site 205 periodically to determine if update catalog 245 has been published. At stage E, agent 250 downloads update catalog 245. Agent 250 implements applicability algorithm for an update tool or agents as depicted in FIG. 10 to determine the applicable updates for each one of managed resources 260. At stage F, deploys the applicable updates to each one of managed resources 260.

Figure 3:
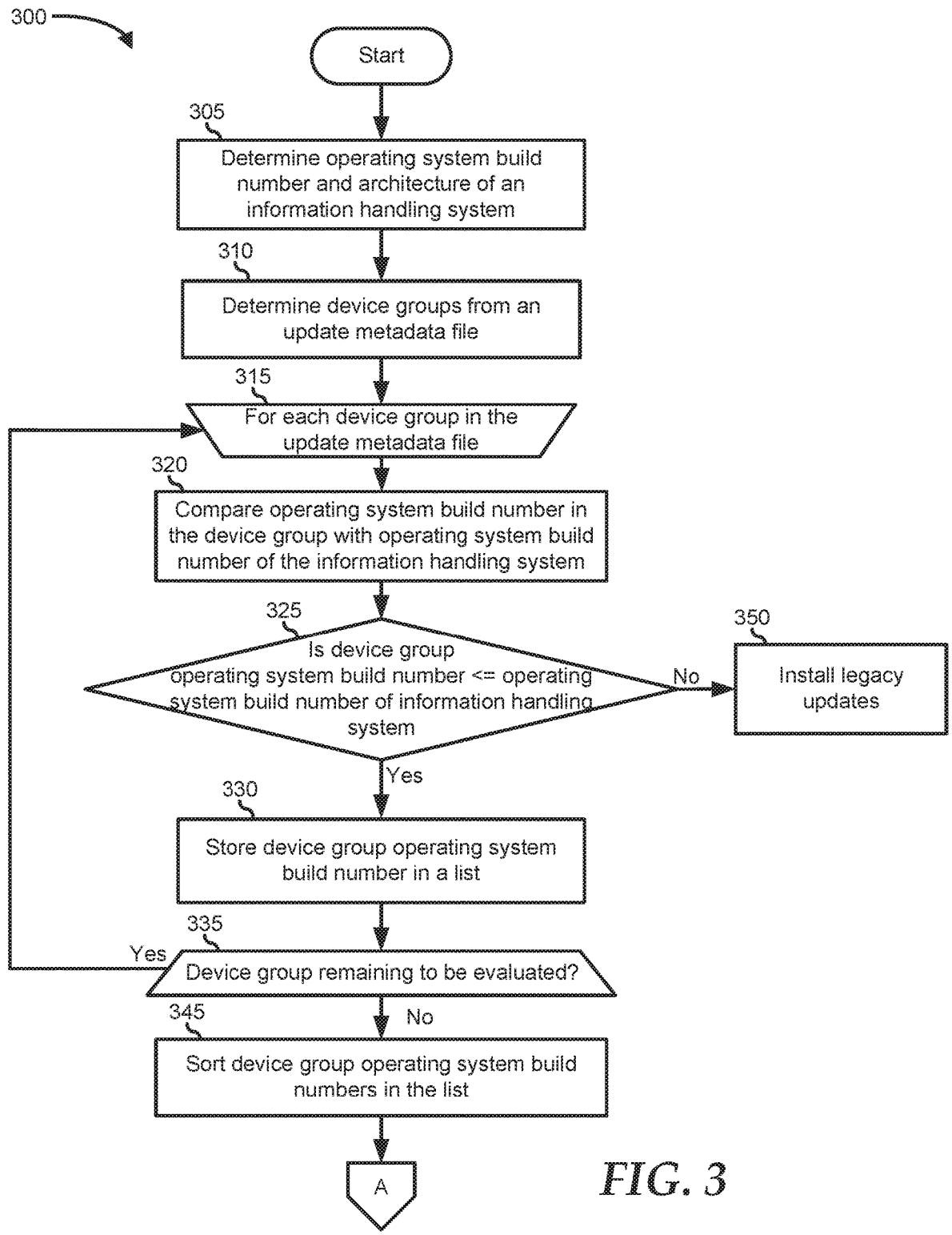
FIG. 3 and FIG. 4 are flowcharts illustrating a method for dynamically determining applicable updates by an update installer, according to at least one embodiment of the present disclosure.

FIG. 3 shows a method 300 for determining applicable updates for an information handling system. The method 300 may be performed by one or more components of FIG. 1 and FIG. 2. In particular, the method 300 may be performed by update installer 230. The method 300 typically begins at block 305. Prior to block 305, an update package may have been downloaded to the information handling system.

At block 305, the method retrieves the operating system build number architecture of an information handling system. The method may use an API to retrieve the aforementioned information. For example, to obtain the full version number for the Windows operating system, the method may call the GetFileVersionInfo function on one of the system dynamic link libraries. The method may store the value of the retrieved operating system build number to a parameter such as SYSTEM_BUILD_NUMBER. The method may assign the retrieved architecture to a parameter such as SYSTEM_ARCHITECTURE. The method proceeds to block 310.

At block 310, the method determines various information by parsing an update metadata file also referred to as metadata file included in the update package. The method determines device groups by parsing the content node of the metadata file. The metadata file may include one or more content nodes such as a content node 803 and a content node 807 of FIG. 8A. Each content node may include one or more device groups such as a device group 804 of FIG. 8A. A device group includes one or more devices. In another embodiment, the content node may include one or more devices as shown in content node 807 of FIG. 8A.

The method may use a data structure such as a list for the device groups. The method may filter the device groups prior to adding the device group to the list. For example, a device that is marked in the metadata file as DCH such as <content dch="true" . . . > is added to the list. If the dch value is marked as true, as shown above, then the method may also determine the operating system base build number applicable to the base device driver in the device group. For example, an operating system base build number in the metadata file such as <content dch="true" base="15043"> is retrieved. The value of the operating system base build number is stored in a parameter such as BASE_BUILD_NUMBER. The parameter BASE_BUILD_NUMBER is used to switch between the legacy driver mode of installation and the DCH compliant driver mode of installation. If a driver is DCH compliant starting Windows 10 RS4, then the BASE_BUILD_NUMBER value will have the corresponding Windows 10 RS4 build number value. For example, as shown above, the value of the operating system base build number is "15043", which is then stored in the parameter BASE_BUILD_NUMBER. The method proceeds to block 315.

At block 315, the method processes the device groups. In processing the device groups, the method may traverse through each device group in the list. The device group being processed may be referred to as the current device group. The method proceeds to block 320. At block 320, the method compares the operating system base build number from the current device group with the operating system build number retrieved from the information handling system. The method proceeds to block 325.

At block 325, the method determines if the value of the operating system base build number of the current device group is less than or equal to the value of the operating system build number retrieved from the information handling system, for example, if BASE_BUILD_NUMBER<=SYSTEM_BUILD_NUMBER, then the method proceeds to block 330. Otherwise, the method proceeds to block 350.

At block 330, the method stores the operating system build number from the current device group in a data structure such as a list. The method proceeds to block 335. At block 335, the method determines if there is another device group remaining to be evaluated. If there is another device group remaining to be evaluated, then the method proceeds to block 315. Otherwise, the method proceeds to block 345.

At block 345, the method sorts the values of the operating system base build number in the list. The values may be sorted in a particular order such as ascending or descending. The method proceeds to block 405 of FIG. 4. At block 350, the method installs the updates according to a legacy installation process (not shown). The legacy updates as used herein supports operating systems less than Windows 10.

Figure 4:
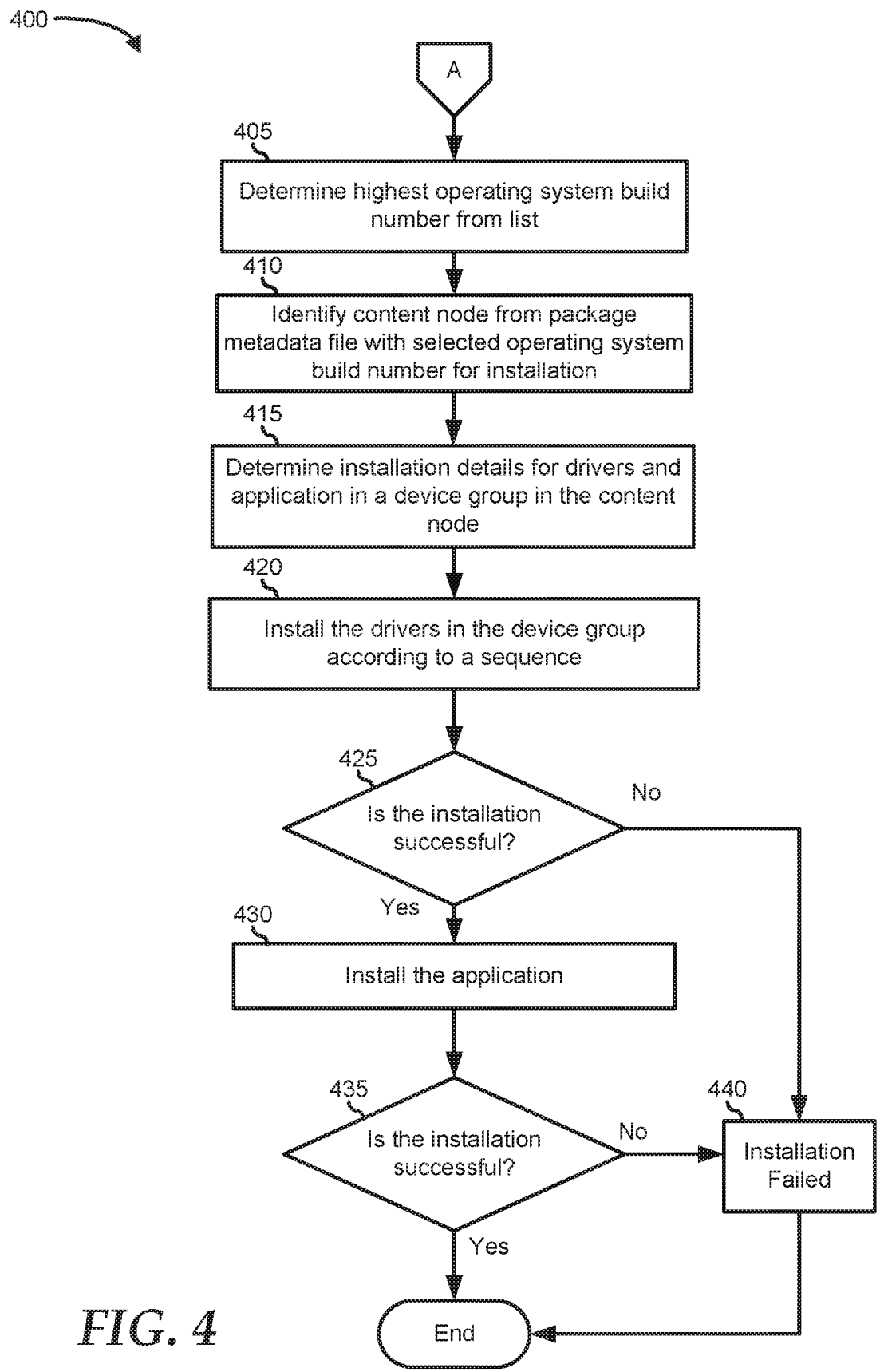

FIG. 4 shows a method 400 which is a continuation of method 300. The method 400 typically begins at block 405. At block 405, the method determines the operating system base build number with the highest value from the list. The method may assign the aforementioned value to a parameter such as SELECTED_BUILD_NUMBER. The method proceeds to block 410. At block 410, the method identifies the content node from the metadata file such as an MUP.xml that matches the value of the operating system in block 405. The method proceeds to block 415. At block 415, the method identifies a content node in the metadata file that includes the device group with the highest operating system build number. The method parses the identified content node and determines the metadata associated the device groups in the content node. For example, the method may identify information associated with a payload of the device group. The payload includes a base driver, an extension driver, a component driver, and an application such as an HSA. For example, the method may determine values for attributes such as a component identifier, a version, a type of the driver, a file name, etc. if the device is a generic device. If the device is non-generic, the method may determine values to attributes such as vendorID, deviceID, subVendorID, and subDeviceID as shown in a device 805 of FIG. 8A. The method proceeds to block 420.

At block 420, the method may determine if the identified device is a supported DCHU device, based on the operating system build number identified in the device group. The method may also determine a staging delay to be used during the installation of the payload. The staging delay is a timing delay between the installations of two drivers or between the installation of a driver and the HSA. The staging delay may be pre-configured by a user prior to the download of the update package.

At block 420, the method installs the payload included in the update package according to a sequence such as via an API. For example, the method may install the base driver, wait for the pre-determined staging delay and then install the extension driver, and the component driver. There may also be a pre-determined staging delay for the installation of the extension driver prior to the installation of the component driver. For example, device group 804 of FIG. 8A includes device 805 and a device 806. Device 805 is a base driver as shown by a value of "base" of an attribute inftype. Device 806 is a component driver as shown by a value "component" of the attribute inftype. Thus, the method may install device 805 prior to installing device 806. The method proceeds to block 425.

At block 425, the method determines whether the installation is successful. The method may set a status code on whether the installation of each driver is successful or not. For example, the method may set the status code to 1 if the installation is successful and to 0 if the installation is a failure. The method may determine if the installation is successful or not via the status code. If the installation is successful, then the method proceeds to block 430. Otherwise, the method proceeds to block 440. At block 440, the installation failed.

At block 430, the method installs the application such as a universal windows platform (UWP) application. The method proceeds to block 435. At block 435, the method determines if the installation of the application is successful. If the installation of the application is successful, the method may update another status code with a success code. After a successful installation of the application, the method ends. Otherwise, the method proceeds to block 440. At block 440, the method determines if the installation of the application failed. The method may update the status code with a failure code and include other information such as an error code. After an unsuccessful installation of the application, the method ends.

Figure 5:
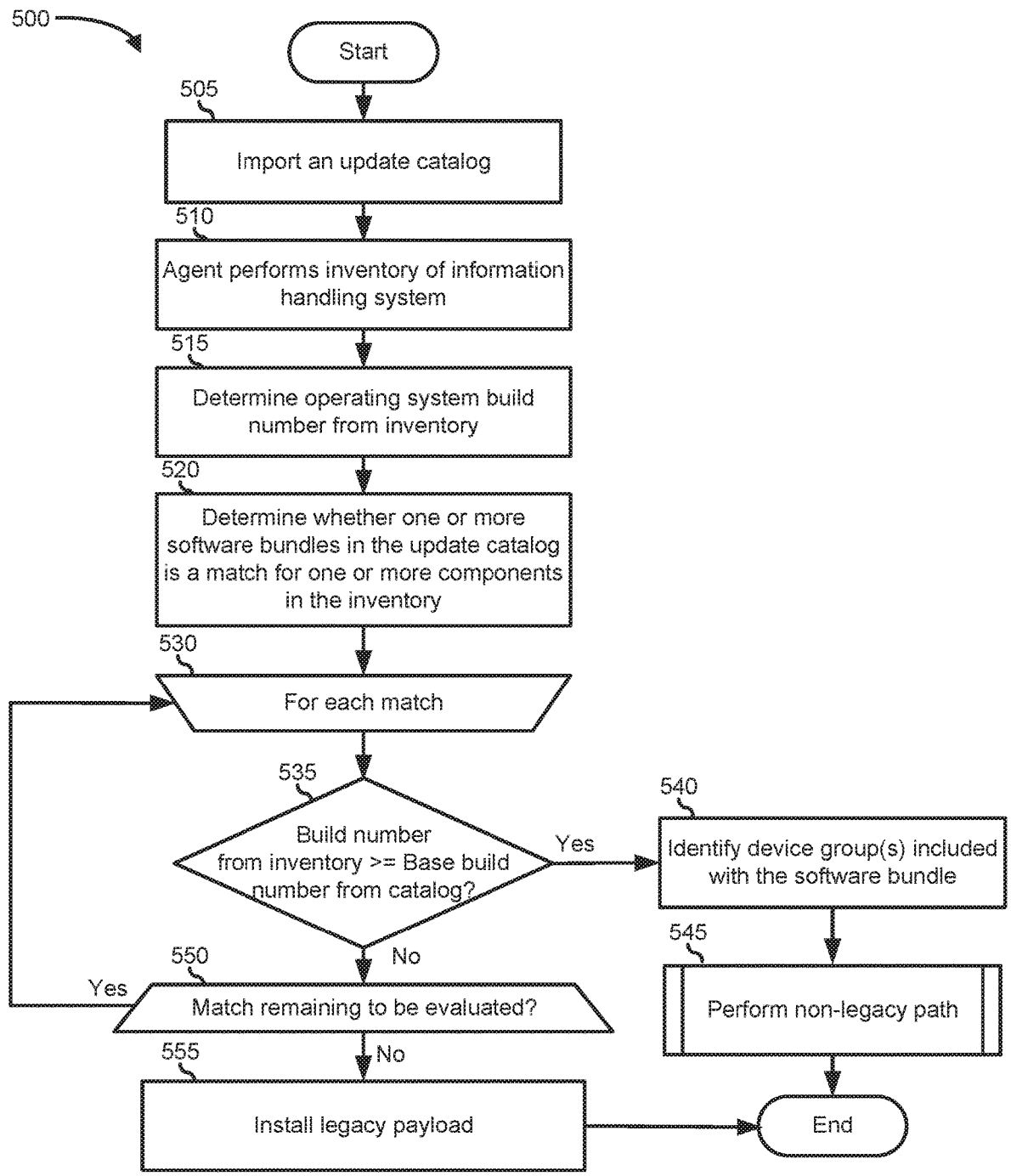
FIG. 5 is a flowchart illustrating a method for dynamically determining applicable updates by an update agent, according to at least one embodiment of the present disclosure.

FIG. 5 shows a method 500 for finding applicable updates for deployment to an information handling system using an update tool also referred to as an update agent or simply agent. The method 500 may be performed by agent 250 of FIG. 2. The agent is a utility that allows for the automation of updates to various components in an information handling system such as driver BIOS, and firmware updates. The method 500 typically starts at block 505.

At block 505, the method downloads or imports an update catalog from a repository. The update catalog carries the metadata information including a driver version, supported device identifiers, supported operating system information, etc. similar to an update metadata file. The update catalog may carry a windows 10 base build number, from which the DCHU compliant drivers are available. The information in the update catalog may be used to determine which update package and/or updates are applicable for the components of the information handling system and how to deploy the applicable update package and/or updates.

The repository may be an OEM support site, an update site maintained by the developer of the operating system such as Windows Update, a site maintained by a vendor or manufacturer of the component. The update catalog may be saved in a database or in a non-volatile storage device. Prior to importing the update catalog, the agent may determine whether the update catalog is applicable to the information handling system. The method may also determine whether the update catalog has not been imported before and/or whether the update catalog is the latest update catalog in the repository. The method may import the latest update catalog and may disregard older catalogs. Based on the update catalog, the method determines an update package or an update that is applicable to the information handling system. The method proceeds to block 510.

At block 510, the method performs an inventory of the components in the information handling system. During the inventory, the method may determine the current versions of the drivers and/or applications associated with the components. An example of an inventory report is shown in inventory report 896 of FIG. 8C. The method proceeds to block 515.

At block 515, the method parses the inventory report to determine the operating system build number from the inventory. For example, the method determines the value of buildNumber in an operatingSystem node 897 of FIG. 8C. The method may also determine information regarding the operating system such as the architecture, the vendor, the version number, the language, etc. The method may put the value of the operating system build number and architecture to parameters SYSTEM_BUILD_NUMBER and SYSTEM_ARCHITECTURE respectively. The method proceeds to block 520.

At block 520, the method determines whether one or more of the software bundles in the update catalog are a match for the one or more components in the inventory. The method parses the imported update catalog file and may perform a system identifier match and an operating system match with the information from the inventory. The method may put the value of the operating system base build number such as shown in a softwareComponent 810 in a parameter SWB_BASE_BUILD_NUMBER. For example, in addition to the operating system build number the method may compare the values of the other attributes of the operating system such as an osArch, a majorVersion, and a minorVersion as shown in operatingSystem node 897 of FIG. 8C with the values of the osArch, the majorVersion, and the minorVersion as shown in a operatingSystem node 826 of FIG. 8B and determines if the values are a match. If the values are a match, then the method may put the software bundle that matches in a data structure such as a list and may proceed to processing each match. For each one of the matches, the method determines whether the updates in the software bundle such as softwareComponent 810 as shown in FIG. 8B are applicable for the information handling system. The method proceeds to block 530.

At block 530, the method processes each identified match. The method may traverse the data structure and process the identified matches accordingly. The identified match being processed may be referred to as a current match. The method proceeds to block 535. At block 535, the method determines whether the operating system build number determined from the inventory is greater than or equal to the operating system base build number of the current match. For example, the method may determine if SYSTEM_BUILD_NUMBER>=SWB_BASE_BUILD_NUMBER. If the operating system build number determined from the inventory is greater than or equal to the operating system based build number then the method proceeds to block 540. Otherwise, the method proceeds to block 550.

At block 540, the method determines supported operating system build numbers of the device group. The method may parse the catalog and identify the supported operating system build number also referred to as operating system base build number for each device group. The method may put the device groups included with the software bundle in a data structure such as a list. The method proceeds to block 545. At block 545, the method goes to a non-legacy path or mode for installing updates also referred to as DCH path or DCHU mode of installation. The non-legacy path installs the DCHU compliant payload in the device group. After performing block 545, the method ends.

At block 550, the method determines if there is another match to be evaluated. If there is a match to be evaluated, the method proceeds to block 530. Otherwise, the method proceeds to block 555. At block 555, the method installs the payload according to a legacy payload installation mode based on a supported devices node in the update catalog such as a supportedDCHDevices 832 of FIG. 8B. After the installation of the payload, the method ends.

Figure 6:
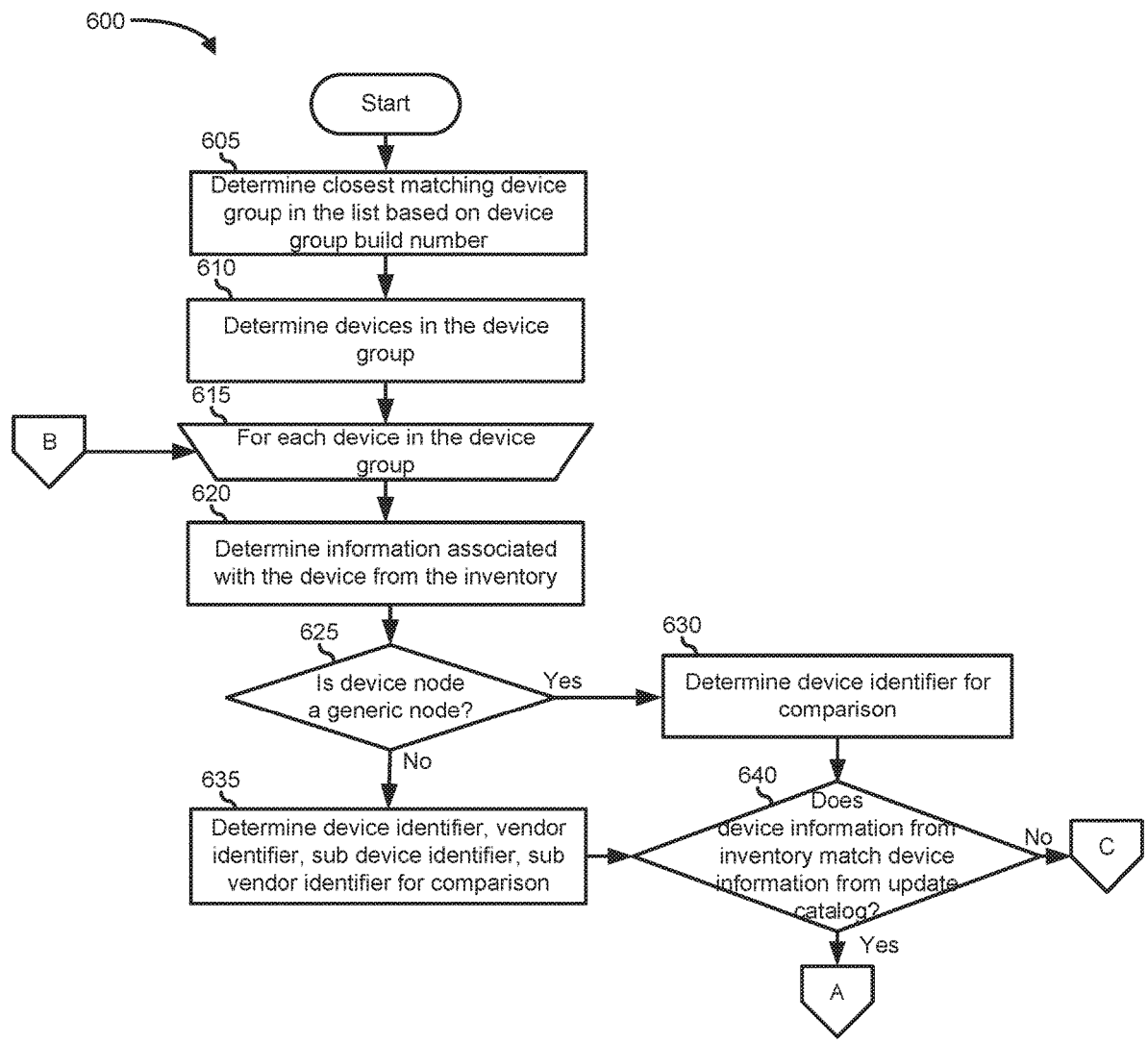
FIG. 6 and FIG. 7 are flowcharts illustrating an applicability algorithm, according to at least one embodiment of the present disclosure.

FIG. 6 is a flowchart illustrating a method 600 for installing drivers that comply with DCHU policies such as universal drivers. Method 600 may be performed by the agent 250 as depicted in FIG. 2. Method 600 is a detailed illustration of block 545 of FIG. 5. The method 600 typically starts at block 605.

At block 605, the method determines the closest matching device group to the component in the inventory based on the data structure or the list created in block 525 of FIG. 5. The method may determine the match based on the operating system build number associated with the device group. For example, the system may determine the following for each device group: SYSTEM_BUILD_NUMBER= DEVICEGROUP_BUILD_NUMBER or SYSTEM_BUILD_NUMBER<DEVICEGROUP_BUILD_NUMBER. The method proceeds to block 610. At block 610, the agent determines the devices included in the closest matching device group. The agent may put the devices in a data structure such as a list for processing. The method proceeds to block 615.

At block 615, the agent processes each device in the device group. The agent may traverse the devices according to the data structure. The device being processed may be referred to as a current device. The method proceeds to block 620. At block 620, the agent determines information associated with the current device. For example, the agent determines a component identifier and/or a device identifier of the current device from the inventory as shown in a device node 898 from FIG. 8C. Each device node includes information regarding a particular device. The method proceeds to block 625. At block 625, the method determines whether the current device node is a generic node as shown in a device node 880 of FIG. 8B. If the current device node is a generic node, the method proceeds to block 630. Otherwise, the method proceeds to block 635.

At block 630, the method determines the value of the identifier attribute for the device in the update catalog. The method may use the value of the identifier to compare with the value of the component identifier in the inventory at block 640. At block 635, the method determines the values for device identifier, a vendor identifier, a sub-device identifier, and sub-vendor identifier in the update catalog. The method may use the aforementioned identified values of various attributes for comparison with the values of the attributes of the component based on the identifier in the inventory. For example, the agent uses a vendorID 860, a deviceID 865, a subVendorID 870, and subDeviceID 875 in FIG. 8B. The method proceeds to block 640.

At block 640 the agent determines if the values of the aforementioned information of the device match the values of the information of a component in the inventory. If the values of the identified attributes are a match, such as the value of the component identifier matches the value of the device identifier, the method may put the matched device in a data structure such as a list for later processing. The method proceeds to block 705 of FIG. 7. Otherwise, the method proceeds to block 730 of FIG. 7.

Figure 7:
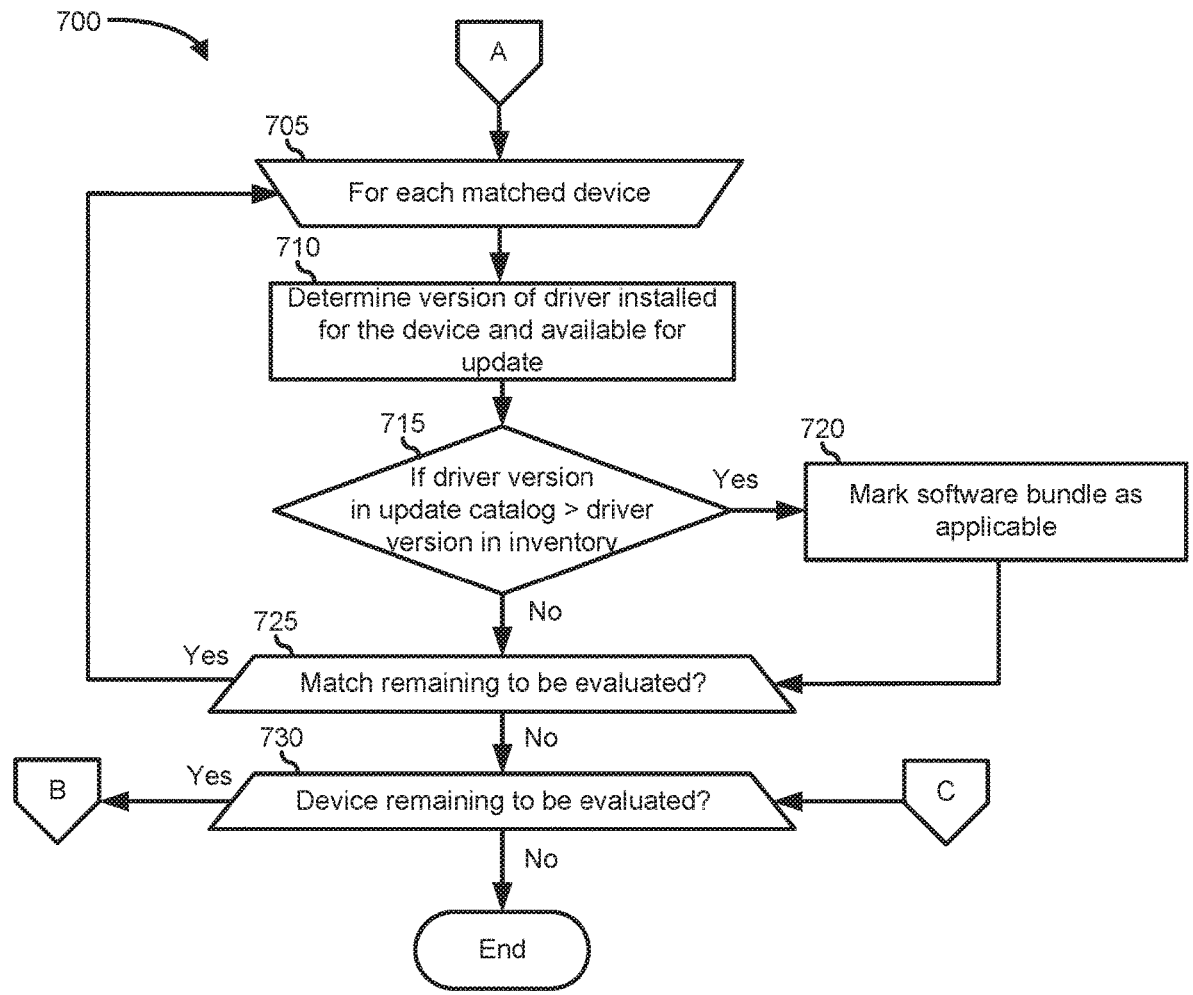

FIG. 7 shows a method 700 which is a continuation of method 600. The method 700 typically begins at block 705. At block 705, the method processes each of the devices with the matched component identifier and/or device identifier values. In processing the matches, the method may traverse through each match in the data structure. The match being processed is referred herein as a current match. The method proceeds to block 710.

At block 710, the method determines the value of a version of the driver in the update catalog and the value of the version of the driver installed for the component in the information handling system based on the inventory. The method may then use the determined values for comparison. The method proceeds to block 715. At block 715, if the value of the version of the driver in the update catalog is greater than the value of the version of the driver installed in the information handling system based on the inventory, the method proceeds to block 720. Otherwise, the method proceeds to block 725.

At block 720, the method marks the software bundle or the update as applicable. The method may use a flag to mark whether the software bundle is applicable or not. For example, the method may set the flag to 1 if the software bundle is applicable. Otherwise, the value of the flag may be set to 0. The method may generate an output that shows the software bundles that are applicable for a review by an administrator prior to download. The method proceeds to block 725. At block 725, the agent determines if there is a matched device remaining to be evaluated. If there is a matched device remaining to be evaluated, then the method proceeds to block 705. Otherwise, the method proceeds to block 730. At block 730, the method determines if there is a device remaining to be evaluated. If there is a device remaining to be evaluated, the method proceeds to block 615 of FIG. 6. Otherwise, the method ends. In another embodiment, the method may install the applicable software bundles subsequent to block 730 prior to the method end. The software bundle includes information regarding the update package such information regarding its installation. For example, as shown in softwareComponent 810, the software bundle includes a package type, a path, and an operating system base build number. Combined with the value of a base location as shown in a manifest node 809 of FIG. 8C and the path in softwareComponent 810, the download location of the update package may be determined such as http://download.dell.com/FOLDER03487950 M/1/Network_Driver_CFXPV_WN32_2.43.2015.1225_A01.EXE.

FIG. 8A shows an example 800-A of a portion of metadata file 222. As shown in supportedoperatingsystems node 802 of metadata file 222, the update metadata file includes an identifier and architecture that is supported by the update package. In addition, metadata file 222 includes one or more content nodes such as a content node 803. Each content node includes one or more device group. A device group is a logical group that includes payload specific to a device. The device group includes one or more devices. Each device in the device group has a globally unique identifier (GUID).

As shown, metadata file 222 includes several device groups such as device group 804. Device group 804 includes several devices such as device 805 and device 806. Device 805 is a non-generic device while device 806 is a generic device.

FIG. 8B shows an example 800-B of update catalog 245. As shown in manifest node 809, information regarding the update package associated with update catalog 245 such as its location is identified. In addition, softwareComponent 810 shows information regarding a software bundle. As shown in update catalog 245, each software bundle includes one or more device groups. A device group includes the drivers and application payload specific to a device identified with a globally unique identifier (GUID). As shown, update catalog 245 includes several device groups one of which is a device group 830. Device group 830 includes two devices, a device 811 with a GUID "guid1" and a device 812 with a GUID "guid2".

Devices 805 and 810 in device group 830 have several common attributes which include an osCode 815 with a value of "W10P4", an osArch 820 with a value of "x64", and a buildnumber 825 with a value of "15063". In addition, each device has its own attributes. For example, a device node 835 which is a generic node is associated with device 811. As shown in device node 835, device 811 includes several attributes such as a componentID 840 with a value of "100352", a version 845 with a value of "6.0.1.8229", a type 850 with a value of "base." Other values for type 850 include "extension" or "component" as shown in device node 880. While device node 855, which is not a generic node, has several attributes which include vendorID 860 with a value of "10EC", deviceID 865 with a value of "0255", subVendorID 870 with a value of "1028", and a subDeviceID 875 with a value of "0864". Non-generic drivers are drivers from a vendor of a particular device such as RealManage Realtek® audio. Generic drives are for devices that usually come with the operating system such as a generic audio device driver from Microsoft.

Device node 880 which is associated with device 812 also shows several attributes. Prior to the current disclosure, typically the drivers for a device are not associated with each other and are installed separately. In the current disclosure, the update installer 230 and the agent are configured to use metadata information in the metadata file and update catalog to correlate the information from the information handling system to determine the device groups which includes the drivers and the application for the device. The update installer 230 and the agent then utilize the correlations in determining which installation path to follow in deploying the applicable updates allowing for a more efficient update deployment.

The base build number is an indicator that identifies from which particular build onwards does DCHU compliance has started for a particular operating system or component. The base build number may also be used to determine which payload is to be installed. For example, attribute buildnumber 825 has a value of "15063", which indicates that components and operating system are applicable for Windows operating system with build number 15063 onwards. Because build number 15063 is a Windows 10 operating system as identified by osCode 815, the drivers for device group 830 are DCHU compliant. Drivers for operating system build numbers below the value 15063 may be considered legacy drivers.

Device groups such as device group 830 is a logical container which includes the drivers and the HAS for the devices in the device group. The drivers include a base driver, an extension driver, and a component driver. A base driver is generally developed by the manufacturer of the device. An extension driver is usually developed by an OEM to enhance the functionality of the base driver. A component driver is a driver for a dependent component for the base driver to work. For example, a service to monitor the performance of the device.

FIG. 8C shows an example 800-C of an inventory report 895. Inventory report 896 includes information regarding the operating system installed in the information handling system as shown in operatingSystem node 897. Inventory report 895 also includes information regarding the components installed in the information handling system such as shown in device node 898.

FIG. 9 shows an example 900 of an applicability algorithm 905 for finding applicable update packages via an update installer. Applicability algorithm 905 includes a section 910 and a section 915. Section 910 determines whether the update package is applicable to the components of the information handling system based on the value of its operating system build number, architecture, and metadata information of the update package. Section 910 also determines whether to use a legacy path (not shown) or a "DCH path." Legacy path pertains to the installation process of drivers used in Windows operating systems earlier than Windows 10. Section 915 describes the algorithm DCH path, which pertains to the installation process for update packages applicable to universal drivers used in Windows 10 and later.

FIG. 10 shows an example 1000 of an applicability algorithm 1005 for finding applicable update packages for an information handling system via an update tool or an agent. Applicability algorithm 1005 includes a section 1010 and a section 1015. Section 1010 determines whether the update package is applicable to the components of the information handling system based on the value of its operating system build number and metadata information of the update package. Section 1010 also determines whether to use a legacy path (not shown) or a "DCH path." Legacy path pertains to the installation process of drivers used in Windows operating systems earlier than Windows 10. Section 1015 describes the algorithm DCH path, which pertains to the installation process for update packages applicable to universal drivers used in Windows 10 and later.

Figure 11:
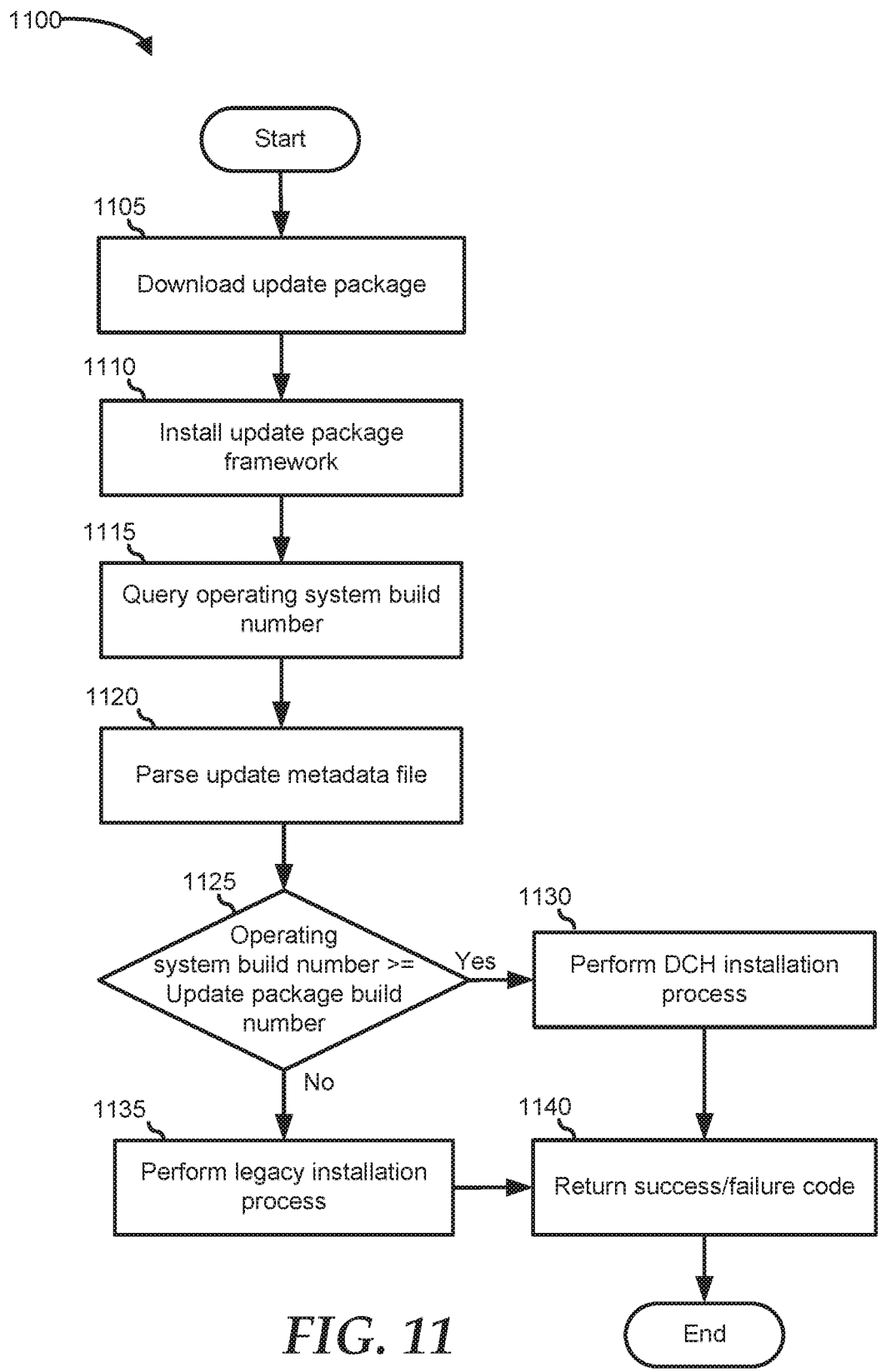
FIG. 11 is a flowchart illustrating a workflow for dynamically determining applicable updates by an update installer, according to at least one embodiment of the present disclosure.

FIG. 11 shows a workflow 1100 for determining and installing applicable update packages via an update installer such as update installer 230 of FIG. 2. The update installer 230 determines whether the components installed in the information handling system has the latest updates. For example, if the information handling system has a non-generic audio device, such as a RealManage Realtek audio then the update installer may determine if the audio device has the latest HSA developed by RealManage Realtek. The update installer also determines if the audio device has the latest drivers. The workflow 1100 typically begins at block 1105.

At block 1105, a user goes to an OEM support site and downloads an update package. The method proceeds to block 1110. At block 11100, the user installs a framework. The update installer may include an installer framework such as Windows web installer. The installer framework which is configured for applying an applicability algorithm to determine the applicable updates for the information handling system, such as applicability algorithm 905 as shown in FIG. 9. The applicability algorithm may be referred to as an update installer applicability algorithm. The method proceeds to block 1115.

At block 1115, the update installer determines the operating system build number of the information handling system. For example, the update installer may use the Windows API to determine the operating system build number, the architecture, the version of the operating system, etc. installed in the information handling system. The method proceeds to block 1120.

At block 1120, the update installer parses the metadata file included in the downloaded update package such as metadata file 222 in FIG. 8A. The update installer determines the operating system base build number, the architecture, etc. that the update package supports. For example, the update installer may determine the values of the supported operating system build number and architecture. The workflow proceeds to block 1125.

At block 1125, the update installer determines whether the determined operating system build number installed in the information handling system is greater than or equal to the supported operating system build number in the metadata file. If the determined operating system build number installed in the information handling system is greater than or equal to the determined supported operating system build number in the metadata file then the workflow proceeds to block 1130. Otherwise, the workflow proceeds to block 1135.

At block 1130, the update installer performs the DCH path or DCH installation process as depicted in section 915 of FIG. 9. The update installer may determine whether the operating system in the information handling system is Windows 10 or greater prior to performing the DCH path installation process. In addition, the update installer may determine whether the devices are DCHU compatible prior to the installation. The DCH installation process may install the applicable updates according to a sequence of installation. For example, if the device group includes a base driver, an extension driver, a component driver, and an application such as an HSA or a UWP application, then the device group may install the base driver first, followed by the extension driver, the component driver and finally if the drivers have been installed successfully the application. The update installer may use a staging delay in between the installation of the drivers and/or the application. The staging delay may be pre-configured prior to the DCH installation process. For example, the staging delay may be set between 1 to 10 seconds. The workflow proceeds to block 1140.

At block 1140, the update installer returns a status code such as a success code or a failure code based on whether the installation of the updates is successful or not. After returning the status code, the workflow ends. At block 1135, the update installer performs a legacy installation of the updates or payload in the update package. The update installer may determine whether the operating system in the information handling system is earlier than Windows 10 prior to performing the legacy installation process. In addition, the update installer may determine whether the devices are not universal drivers or not DCHU compatible prior to the legacy installation process. The legacy installation process determines the device group that contains a payload of the applicable updates to the information handling system and pushes the entire payload to the information handling system. The legacy installation process may be performed using an installer from the vendor of the device or driver. The workflow proceeds to block 1140.

Figure 12:
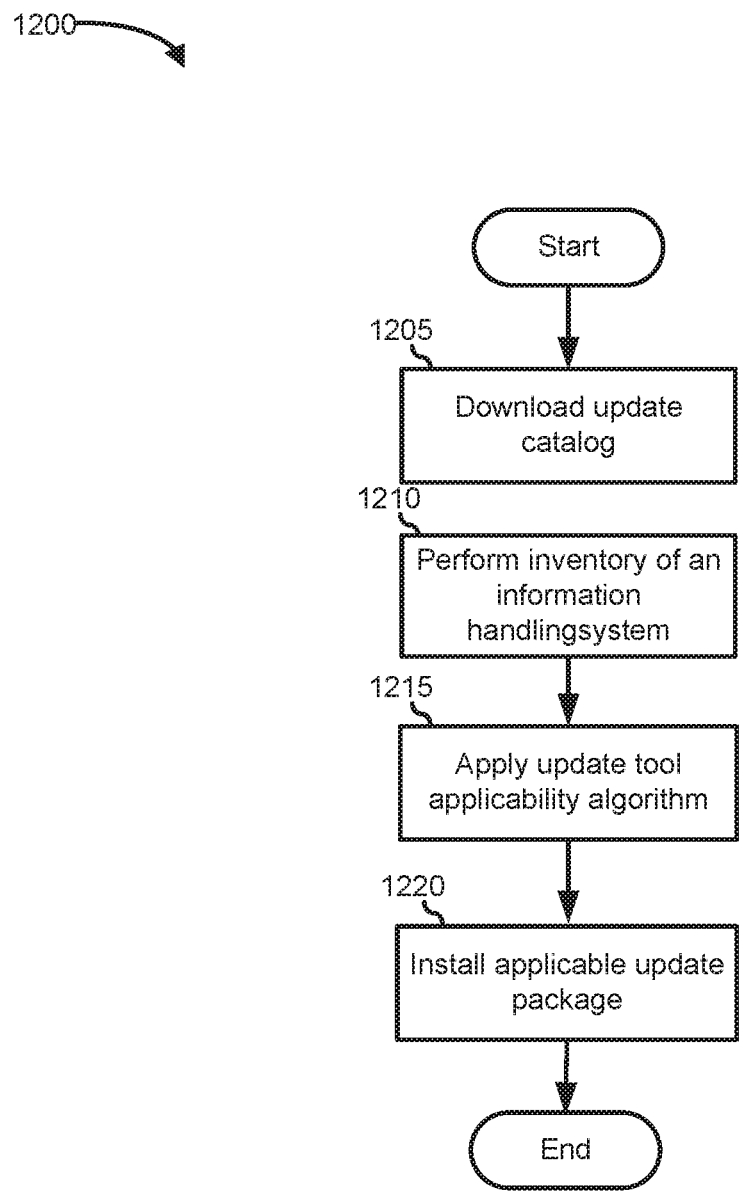
FIG. 12 is a flowchart illustrating a workflow for dynamically determining applicable updates by an update agent, according to at least one embodiment of the present disclosure.

FIG. 12 shows a workflow 1200 for determining and installing applicable update packages or updates via an update agent also referred to as an agent such as agent 250 of FIG. 2. The workflow 1200 typically begins at block 1205. At block 1205, the agent installed in an information handling system downloads or imports an update catalog such as update catalog 245 of FIG. 8B from a repository such as an OEM support site or Windows Update. The workflow proceeds to block 1210.

At block 1210, the agent performs an inventory of the components and operating system of the information handling system generating an inventory report such as inventory report 895 of FIG. 8C. The workflow proceeds to block 1215. At block 1215, the agent applies an applicability algorithm designed for update tools such as applicability algorithm 1005 of FIG. 10 subsequent to its inventory step. The applicability algorithm may determine one or more software bundles that are applicable to the information handling system based on the operating system and components installed in the information handling system and the supported operating system and updates in the update catalog. The workflow proceeds to block 1220. At block 1220, the agent installs the applicable update package based on the applicable software bundle determined in block 1215. After installing the update package, the workflow ends.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein. Also, the term "user" in this context and elsewhere herein is intended to be more broadly construed to encompass, for example, human, hardware, software or firmware entities, as well as various combinations of such entities.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method for dynamically determining applicable updates for an information handling system, the method comprising:
   downloading, by a processor, an update package that includes an update installer for updating the information handling system;
   retrieving an operating system build number of the information handling system;
   parsing a metadata file included in the update package to determine a device group based on the operating system build number, wherein the device group includes the applicable updates for the information handling system;
   determining a mode of installation of the applicable updates based on a supported operating system build number of the device group, wherein the device group includes the applicable updates, wherein the applicable updates include a base driver and an extension driver, and wherein the mode of installation includes a declarative componentized hardware (DCH) compliant installation mode and non-DCH compliant installation mode;
   determining a sequence of installation of the applicable updates, wherein the sequence of installation includes a staging delay between installation of the base driver and the extension driver; and
   installing the applicable updates according to the sequence of installation and the mode of installation.

2. The method of claim 1, wherein the determining the applicable updates is based on applying an applicability algorithm.

3. The method of claim 1, wherein the determining the applicable updates further includes determining whether the device group is declarative, componentized, hardware support application and universal application programming interface compliant.

4. The method of claim 1, wherein the device group includes the applicable updates for a component of the information handling system.

5. The method of claim 1, wherein the device group includes a hardware support application based on the supported operating system build number.

6. The method of claim 5, wherein the applicable updates include a component driver.

7. The method of claim 5, further comprising installing the hardware support application after the installation of the base driver or the extension driver.

8. The method of claim 7, further comprising using a Windows application programming interface in the installing of the hardware support application.

9. A method for dynamically determining an applicable update package for an information handling system, the method comprising:
   performing, by an update agent, an inventory of the information handling system, wherein the inventory includes components installed in the information handling system, and wherein the inventory also includes an operating system build number of the information handling system;
   downloading an update catalog that includes metadata regarding one or more update packages available for the information handling system based on the operating system build number;
   parsing the update catalog to determine a software bundle with a supported operating system build number that is less than or equal to the operating system build number;
   determining whether a version of a device associated with the software bundle is greater than a particular version of one of the components in the inventory, wherein an identifier of the device matches a particular identifier of the component;
   in response to the determining that the version of the device is greater than the particular version of the component, marking the software bundle as applicable;
   determining the applicable update package based on the software bundle;

determining a mode of installation based on the supported operating system build number of a device group that includes the applicable update package, wherein the mode of installation includes a declarative componentized hardware (DCH) compliant installation mode and a non-DCH compliant installation mode;

determining a sequence of installation of the applicable update package that includes a base driver and an extension driver, wherein the sequence of installation includes a staging delay between installation of the base driver and the extension driver; and installing the applicable update package according to the sequence of installation of the applicable update package.

10. The method of claim 9, wherein the applicable update package includes updates for the information handling system.

11. The method of claim 9, further comprising determining the mode of installation for a payload for the device.

12. The method of claim 11, further comprising determining the device group with the supported operating system build number that is closest to the operating system build number of the information handling system.

13. The method of claim 12, wherein the device is included with the device group with the supported operating system build number that is the closest to the operating system build number.

14. A system for dynamically determining applicable updates for an information handling system, the system comprising:

a processor coupled to a systems manager;

the systems manager configured to:
  retrieve an update package that includes an update installer for updating the information handling system; and
  install the update package with the update installer; and the update installer configured to:
  retrieve an operating system build number from the information handling system;
  parse a metadata file included in the update package to determine a device group based on the operating system build number, wherein the device group includes the applicable updates for the information handling system;
  determine a mode of installation of the applicable updates based on the operating system build number of the device group wherein the device group includes the applicable updates that include a base driver and an extension driver, and wherein the mode of installation includes a declarative componentized, hardware (DCH) compliant installation mode and a non-DCH compliant installation mode;
  determine a sequence of installation of the applicable updates, wherein the sequence of installation includes a staging delay between installation of the base driver and the extension driver; and
  install the applicable updates according to the sequence of installation and the mode of installation.

15. The system of claim 14, wherein the metadata file includes metadata regarding the device group.

16. The system of claim 14, wherein the device group includes one or more devices.

17. The system of claim 16, wherein one of the devices is a generic device.

18. The system of claim 14, wherein the determining the applicable updates is further based on drivers and hardware applications installed in the information handling system.

* * * * *